United States Patent [19]

Young et al.

[11] Patent Number: 4,820,394
[45] Date of Patent: Apr. 11, 1989

[54] PHASE CHANGEABLE MATERIAL

[75] Inventors: Rosa Young, Troy, Mich.; Eugenia Mytilineou, Peristeri, Greece

[73] Assignee: Energy Conversion Devices, Inc., Troy, Mich.

[21] Appl. No.: 935,881

[22] Filed: Dec. 1, 1986

Related U.S. Application Data

[62] Division of Ser. No. 674,112, Nov. 21, 1984, Pat. No. 4,653,024.

[51] Int. Cl.$^4$ .............................................. C23C 14/58
[52] U.S. Cl. ........................ 204/192.21; 204/192.27; 204/192.28; 427/76; 365/113
[58] Field of Search ................................. 365/113, 163; 204/192.26, 192.27, 192.28, 192.29; 156/DIG. 80; 346/135.1; 430/945; 427/42, 74, 76

[56] References Cited

U.S. PATENT DOCUMENTS

| | | | |
|---|---|---|---|
| 3,715,634 | 2/1973 | Ovshinsky | 357/2 |
| 3,801,966 | 4/1974 | Terao | 365/113 |
| 4,370,391 | 1/1983 | Mori et al. | 346/137 |
| 4,425,570 | 1/1984 | Bell et al. | 346/76.2 |
| 4,522,663 | 6/1985 | Ovshinsky et al. | 204/192.26 |
| 4,533,450 | 8/1985 | Moustakas | 204/192.26 |
| 4,555,300 | 11/1985 | Arnold et al. | 156/DIG. 8 |
| 4,579,807 | 1/1986 | Blonder et al. | 204/192.26 |
| 4,599,705 | 7/1986 | Holmberg et al. | 365/163 |
| 4,608,142 | 8/1986 | Gomi et al. | 204/192.26 |
| 4,613,519 | 9/1986 | Yacob | 365/113 |
| 4,653,024 | 3/1987 | Young et al. | 365/113 |
| 4,660,175 | 4/1987 | Strand | 365/113 |
| 4,663,008 | 5/1987 | Takeoka et al. | 204/192.26 |

*Primary Examiner*—John F. Niebling
*Assistant Examiner*—Steven P. Marquis
*Attorney, Agent, or Firm*—Richard M. Goldman; Marvin S. Siskind; Kenneth M. Massaroni

[57] ABSTRACT

Disclosed is a projected beam switchable data storage device having a state changeable memory material. The memory material is a multi-phase system having substantially continuous, dielectric, ceramic phase and discrete cells of a state switchable phase.

20 Claims, 4 Drawing Sheets

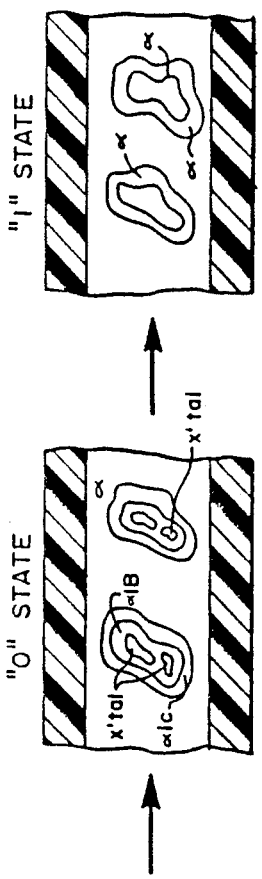
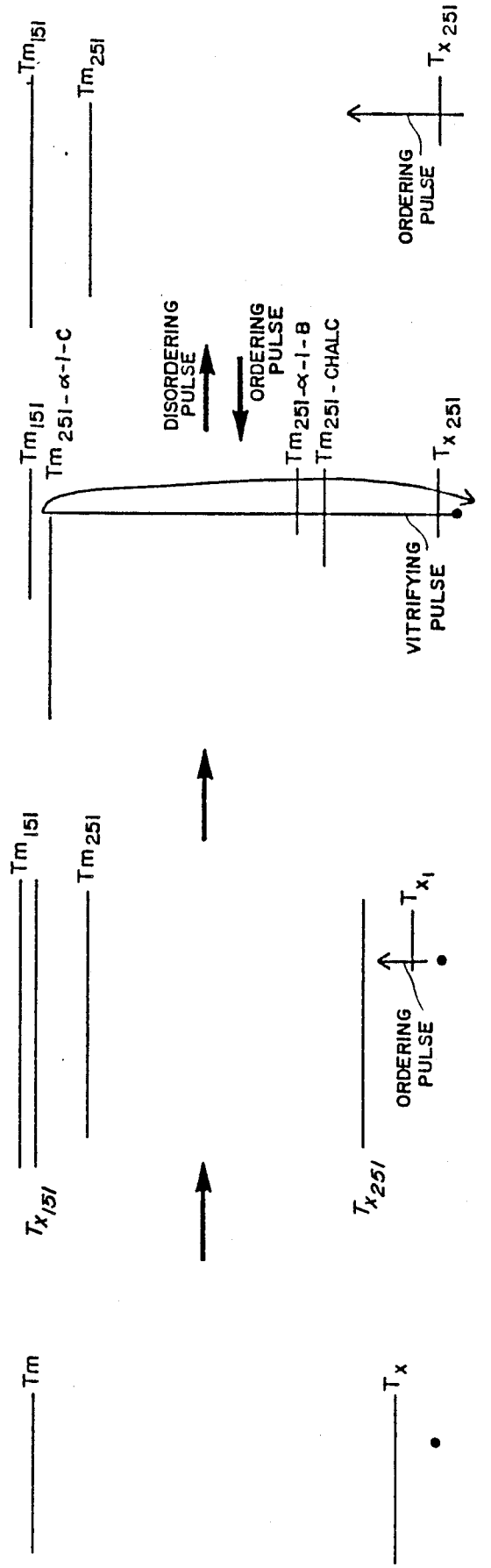

PHASE CHANGEABLE MATERIAL

This application is a continuation of application Ser. No. 674,112, filed on Nov. 21, 1984, now U.S. Pat. No. 4,653,042 issued Mar. 24, 1987.

ART TO WHICH INVENTION RELATES

The invention disclosed herein relates to optical data storage devices where data is stored in a material, e.g. a state changeable material, that is switchable between two detectable states by the application of projected beam energy thereto.

BACKGROUND OF THE INVENTION

Non ablative, state changeable, optical data storage systems record information in a state changeable material that is switchable between at last two detectable states by the application of energy thereto, for example, the application of projected beam energy such as optical energy, particle beam energy or the like.

The state changeable optical data storage material is present in an optical data storage device having a structure such that the optical data storage material is supported by a substrate and encapsulated in encapsulants. The encapsulants may include anti-ablation materials and layers, thermal insulating materials and layers, anti-reflection layers between the projected beam source and the data storage medium, reflective layers between the optical data storage medium and the substrate, and the like. Various layers may perform more than one of these functions. For example, the anti-reflection layers may also be thermal insulating layers. The thicknesses of the layrs, including the layer of state changeable data storage material, are optimized whereby to minimize the energy necessary for state change while retaining the high contrast ratio, high signal to noise ratio, and high stability of the state changeable data storage material.

The state changeable material is a material capable of being switched from one detectable state to another detectable state by the application of projected beam energy thereto. State changeable materials are such that the detectable states may differ in their morphology, surface topography, relative degree of order, relative degree of disorder, electrical properties, and/or optical properties, and that they be detectable therebetween by the electrical conductivity, electrical resistivity, optical transmissivity, optical absorbsion, optical reflectivity and any combination thereof.

The optical data storage material is typically deposited as a disordered material and formed or initialized to a system having relatively reproducable erased or "0" crystalline properties and relatively reproducable written, binary "1" amorphous detectable properties with a relatively high degree of history invariant discrimination therebetween for a high number of write-erase cycles, i.e. for a relatively high number of vitrify-crystallize cycles.

Deposition may be by evaporative deposition, chemical vapor deposition, or plasma deposition. As used herein plasma deposition includes sputtering, glow discharge, and plasma assisted chemical vapor deposition. The resulting as deposited disordered material must be initialized as described for example in the commonly assigned copending application of Rosa Young and Napoleon Formigoni for *Method Of Forming An Optical Data Storage Device*. That is, the memory must be conditioned, formed, initialized, or otherwise prepred to receive data if the data is going to be recorded in a disordered ("binary") state. Initialization, i.e. formation, requires the conversion of the phase changeable data storage material from the as deposited disordered state to a stable system switchable between a vitrified, disordered, written state corresponding to binary 1 and an ordered "erased", crystallized state corresponding to binary "0" with history invariant cycling properties.

Present systems are multiphase systems where the ordering phenomena includes a plurality of solid state reactions to convert a system of disordered materials to a system of ordered and dsordered materials, and where the vitrification phenomena includes solid-solid, solid-liquid, and liquid-liquid reactions, including reactions at phase interfaces, whereby to convert a system of disordered and ordered components to a system of disordered components. The above phase separations occur over relatively small distances with intimate interlocking of the phases and gross structural discrimination.

Exemplary of this reacting system is the reaction of re prior art disordered germanium-tellurium-oxygen systems under "crystallizing" conditions to form germanium oxide, germanium dioxide, tellurium, and different germanium-tellurium compounds where the tellurium is crystalline. The reactions are characterized by the buildup of stable germanium oxides which do not consistently react with the germanium-tellurium components on vitrification. The buildup of germanium oxides, within the memory material is, for the energies of interest, relatively irreversible. This is because of the high melting temperatures and stability of the oxides. This ultimately leads to a cycle history dependancy as oxide builds up and "erase-write" discrimination changes over the number of cycles.

SUMMARY OF THE INVENTION

The problem of the loss of cycle history invariance as the number of cycles reaches large numbers is obviated by the method and apparatus of the present invention.

As herein contemplated, there is provided a projected beam data storage device having memory material switchable between detectable states by the application of projected beam energy thereto. The memory material itself has at least two phases, one of the phases being substantially non-switchable at the energies of interest and substantially continuous, and the other of the phases being switchable between detectable states and dispersed in substantially discrete cells through the substantially continuous phase. While the cells are referred to as discrete, they may be interconnected.

The dispersed phase of the memory material is reversibly switchable between detectable states and is settable from a first state to a second state and reversible therefrom, for example, by optical energy, particle beam energy, or the like. Exemplary material for forming the dispersed, switchable phase includes chalcogenides. Exemplary chalcogenide compositions include tellurium, for example, where the tellurium is present with a cross linking agent or agents. Thus, the chalcogenide composition is reversibly switchable between (1) an amorphous, first tellurium-cross linking agent composition and (2) crystalline tellurium in the presence of an amorphous, second-tellurium-cross linking agent composition. The crystalline tellurium and the disordered second tellurium-cross linking agent composition effectively phase separate upon crystallization of the amorphous, first tellurium-cross linking agent composition. By "effectively phase separate" is meant that the phase separation is sufficient to provide discrimination between the two states.

Suitable cross linking agents are the elements of Groups IIIB, IVB, VB, and VIB of the Periodic Table. These include Al, In, and Ga from Group IIIB, Si, Ge, and Sn from Group IVB, N, P, As, Sb, and Bi from Group VB, and S and Se from Group VIB, as well as combinations thereof. Exemplary cross linking agents include silicon, germanium, tin, arsenic, antimony, and mixtures thereof, especially silicon and/or germanium, either alone or with one or more of tin, arsenic, or antimony. Exemplary chalcogenide compositions include the chalcogenide, e.g., tellurium, and a cross linking agent, e.g., silicon and/or germanium, or silicon and/or germanium with another cross linking agent in an amount sufficient to form a stable disordered chalcogenide. Geneally the atomic ratio of the cross linking agents to total tellurium and cross linking agent(s) is from about 1 percent to about 20 percent. Additionally, oxygen may be present in the system where the atomic ratio of oxygen to total tellurium and cross linking agent(s) is from about 2 percent to about 30 percent.

The substantially continuous phase is relatively nonswitchable, having properties characterized as refractory, ceramic or dielectric. Generally, the melting temperature of the non-switchable phase is above about 1000° C., while the melting temperature(s) of the switchable phase(s) is less than 700° C. Exemplary materials for the relatively nonswitchable continuous phase are silicon oxides, silicon nitrides, aluminum oxides, and germanium oxides. The melting temperature of the substantially continuous, nonswitchable phase is greater than the melting temperature of the dispersed switchable phase. Preferably, the melting of the continuous, non-switchable phase is above about 1000° C., and the melting temperature of the switchable phases, including crystalline and disordered regions thereof, is less than 700° C. While the non-switchable phase is referred to as being substantially continuous, it need only be a shell around individual cells of state change material.

Thus, there is provided a system of discrete individual cells of switchable material within a continuous phase of a substantially nonswitchable material. According to a further exemplification of the invention herein contemplated, there is provided a method of providing a layer of memory material for a projected beam data storage device where the memory material is switchable between detectable states by the application of projected beam energy thereto. The memory material has at least two phases, one phase being substantially continuous and relatively nonswitchable, and the other of the phases being switchable between the detectable states and dispersed in substantially discrete cells through the substantially continuous phase.

The memory material may be formed by depositing the state change material and the encapsulant material whereby to form a substantially uniform deposit thereof and thereafter substantially irreversibly separating the deposit into a substantially continuous encapsulant phase and discrete cells of the state changeable phase dispersed through the encapsulant.

According to a further exemplification, the state changeable memory material may be deposited by depositing substantially uniform layers of state changeable material and encapsulant material whereby to form a substantially uniform layer thereof, for example, to a thickness of about 100 to about 200 angstroms and thereafter depositing, for example, to a thickness of about 30 to about 50 angstroms a layer of encapsulant material, followed by subsequent build up of alternating layers of (a) a codeposit of state change material and encapsulant material as a substantially uniform deposit and (b) a layer consisting essentially of encapsulant material, up to a total thickness of about 2 to 8 or more layers of codeposited state change material and encapsulant material with layers of encapsulant material therebetween, thereby providing a layer of memory material 500 to 1500 or more angstroms thick.

The state change material and encapsulant material may be deposited by various means including sputtering, such as cosputtering, reactive sputtering, reactive cosputtering, or evaporating or coevaporating state change material and encapsulant material.

After deposition, a series of vitrification or crystallization and vitrification steps are carried out whereby to effect phase separation, resulting in the formation of a substantially continuous, nonphase changeable phase having cells of phase changeable material dispersed therethrough.

THE FIGURES

The invention may be particularly understood by reference to the Figures appended hereto.

FIGS. 3A, 3B, 3C, and 3D show the phase separations within the layer as the material is crystallized and vitrified to form a stable, cycle invariant system of phase change material and substantially nonphase change material.

FIGS. 4A, 4B, 4C, and 4D show the shift of crystallization temperature after the oxides have been formed, and the temperature cycles, including the relative crystallization temperatures and melting temperatures of the components on phase separation, corresponding to the morphology shown in FIGS. 3A through 3D.

Figure 5A:
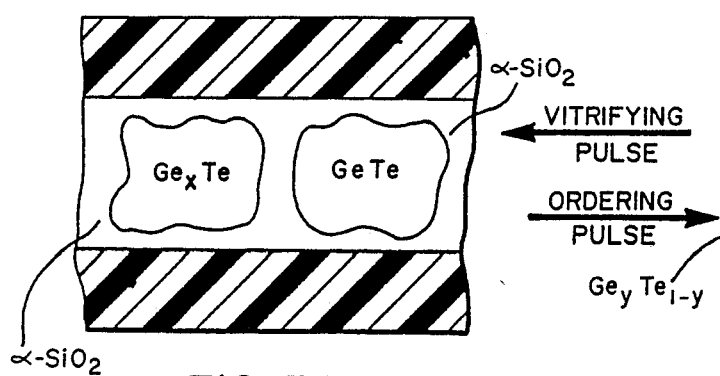
Figure 5B:
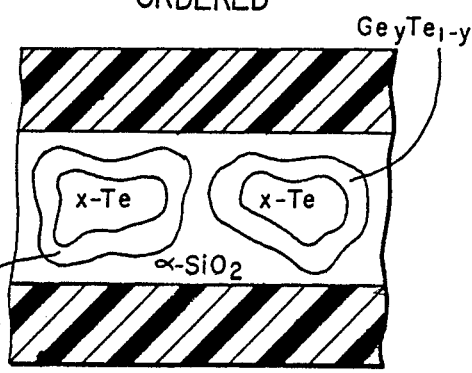

FIGS. 5A and 5B show a section of memory material with the vitrifying pulse and ordering pulse.

Figure 6:
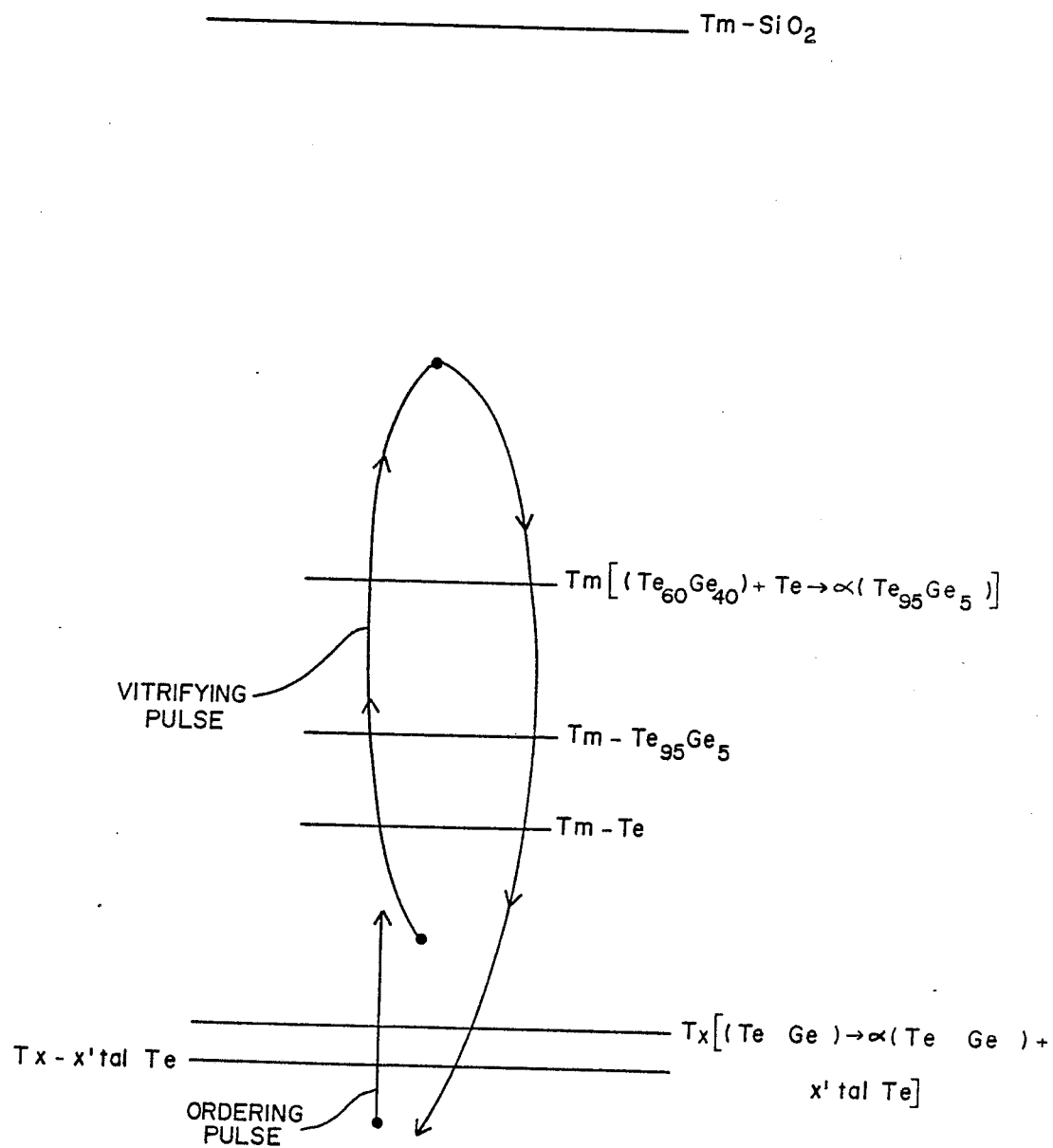

FIG. 6 is a simplified temperature, phase change diagram for a typical system prepared according to the method of the invention.

Figure 7:
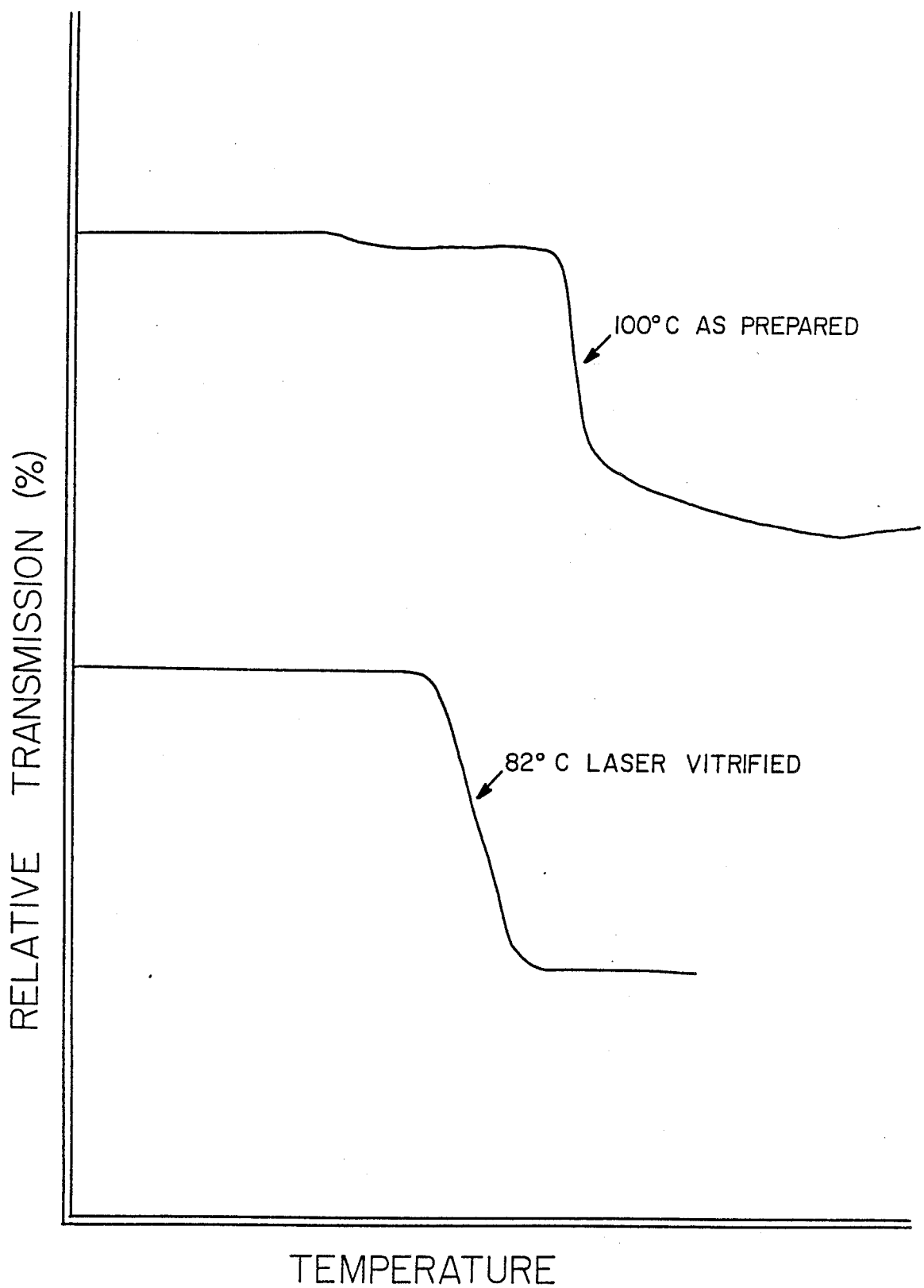

FIG. 7 is experimental data of the shift of the crystllization temperature as shown by the optical transmission versus temperature versus thermal history diagram.

DETAILED DESCRIPTION OF THE INVENTION

According to the invention described herein, there is provided a projected beam data storage device having a memory material switchable between detectable states by the application of projected beam energy thereto. The memory material has at least two phases. One of the phases is substantially continuous and relatively nonswitchable. That is, it is relatively nonswitchable between states of differing degrees of disorder, structure or properties at the energies used to switch the other phase. The other of the phases is switchable between detectable states and is dispersed in discrete cells through the substantially continuous phase.

According to a further exemplification of the invention herein contemplated, there is provided a method of forming a layer of memory material for the projected beam data storage device. The method comprises depositing state change material and encapsulant material whereby to form a deposit thereof, for example, a substantially uniform deposit, or layers of deposits, and then substantially irreversibly separating the deposits into a substantially continuous encapsulant phase and discrete cells of the phase changeable phase dispersed through the encapsulant material.

Figure 1:
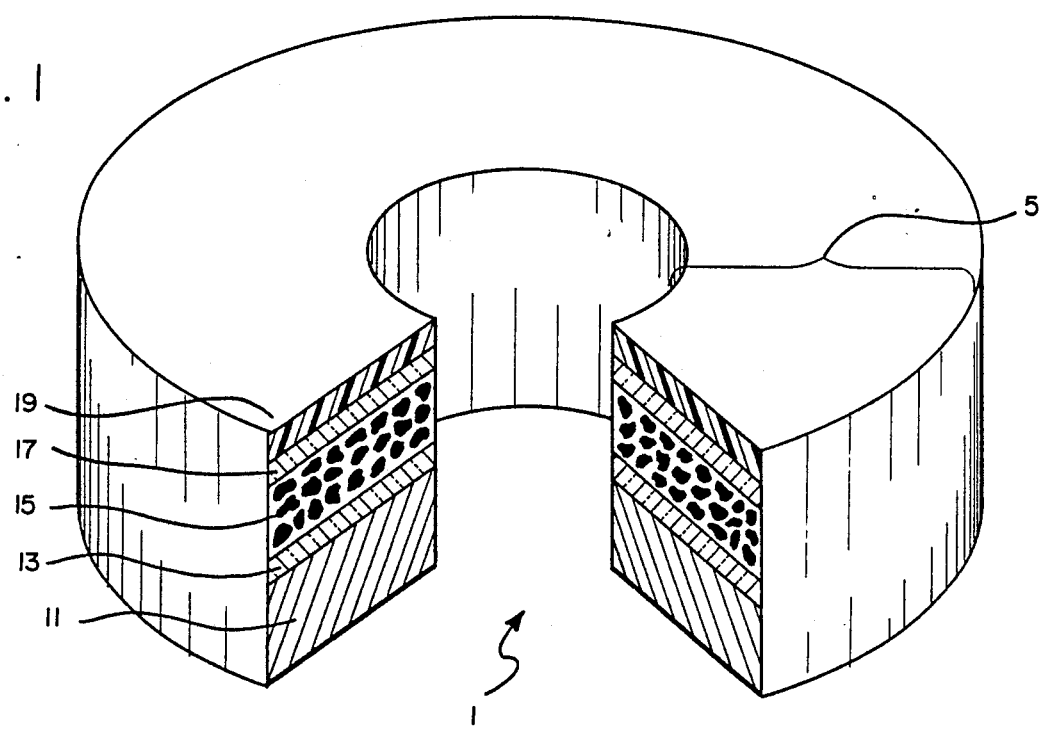
FIG. 1 is a partial cut-away isometric view, not to scale with exagerated latitudinal dimensions and vertical scale, of an optical data storage device.

FIG. 1 shows a projected beam data storage device 1 having a memory region 5. Within the memory region, shown in partial cut-away, is a substrate 11. Deposited on the substrate 11 is a thermal insulating and reflective layer 13. Atop the thermal insulating and reflective layer 13 is the memory layer 15. Above the memory layer 15 is an anti-ablation layer 17 and a protective layer 19. Most commonly, the protective layer will be a substantially transparent plastic layer.

Figure 2:
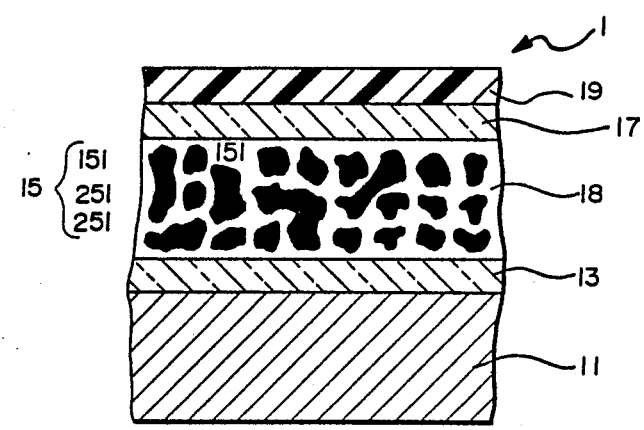
FIG. 2 is a detailed view of the optical data storage device of FIG. 1 showing the substrate and the various layers, including the layer of memory material, therein.

FIG. 2 shows the optical data storage device 1, and especially the memory layer 15, in substantially greater detail. The memory layer includes a substantially uniform phase 151 having dispersed therethrough a plurality of individual cells 251.

An individual memory element generally presents horizontal area on the order of 1 micron in diameter to the projected beam energy source, while the individual cells 251 generally have a maximum dimension on the order of 100 to 1000 angstroms. Thus an individual memory element or bit may contain several hundred or more cells 251.

The dispersed phase of memory material within the individual cells 251 is reversibly switchable between the detectable states, that is, switchable from one detectable state to a second detectable state and reversibly switchable back to the first detectable state. The individual cells of dispersed phase material 251 are switchable, for example, by optical energy such as collimated monochromatic light, collimated nonmonochromatic light, noncollimated and noncollimated nonmonochromatic light. The individual cells 251 of the dispersed phase of the memory material 15 may also be switchable by particle beam energy.

The phase change material within the individual cells 251 of the dispersed, switchable material is typically a chalcogenide composition, for example, a chalcogenide composition containing tellurium. Most commonly, the chalcogenide composition contains tellurium and one or more cross linking agent(s). Cross linking agents are elements of Groups IIIB, IVB, VB, and VIB of the periodic chart, including Al, In, and Ga from Group IIIB, Si, Ge, and Sn from Group IVB, N, P, As, Sb, and Bi from Group VB, S and Se from Group VIB, and mixtures thereof. Most commonly, the cross linking agent is Ge, either alone or with one or more of Sn, As, or Sb. Additionally, the chalcogenide composition may contain more active materials such as oxygen, sulfur, or mixtures thereof as well as further cross linking agents such as tin, arsenic, or antimony and reflectivity enhancing additives such as gallium, or tin, and the like. In a preferred exemplification, the chalcogenide is tellurium, the cross linking agent is germanium either alone or with additional cross linking agents, e.g., tin, arsenic, and/or antimony, and the atomic ratio of cross-linking agent(s) to total tellurium and cross-linking agents is from about 1 percent to about 20 percent. Additionally, the individual cells 251 may further contain reflectivity enhancing additives, such as tin with a ratio of reflectivity enhancing additive to chalcogenide of from about 2 percent to about 10 percent.

The substantially continuous phase is relatively non-switchable. That is, the material is either amorphous having a crystallization temperature above the melting temperature of the highest melting major component required to be melted within the phase changeable individual cells 251 or the material is crystalline and has a melting temperature substantially higher than the melting temperature of any material required to be melted in order to effect the vitrification of the material within the individual cells 251. The substantially continuous phase 151 may be equivalently referred to as a refractory material, a dielectric material, or a ceramic material. Most commonly, the material forming the substantially continuous phase 151 is a refractory material chosen from the group consisting of silicon oxides, silicon nitrides, aluminum oxides and germanium oxides. The formation of a stable, non-switchable, substantially continuous phase 151 (a shell thereof around individual cells 151) in the film of memory material 15 appears to prevent further phase separation and suppresses large grain growth, i.e., growth of grains over about 200 angstroms.

The layer of memory material 15 having the substantially continuous phase 151 and the dispersed individual cells 251 of state switchable material is prepared by depositing the state change material and the encapsulant material to form a deposit thereof, and phase separating the deposit.

According to one exemplification, the materials are deposited or codeposited, e.g. by evaporation, co-evaporation, reactive sputterig, or reactive cosputtering, to form a substantially uniform deposit thereof. Evaporation includes electron beam evaporation and thermal evaporation.

According to an alternative exemplification, individual layers may be formed having a thickness of about 150 to about 500 angstroms. The layers may be substantially uniform deposits of state change material and encapsulant material with layers of encapsulant material, for example, from about 30 to about 100 angstroms thick, therebetween. In this way, a layered coating of (1) substantially uniform state change material and encapsulant layers, and (2) encapsulant material layers is deposited. The resulting coating is about 500 to 1500 or more angstroms thick, the exact thickness being experimentally determined to optimize contrast at the laser wavelengths of interest.

Alternatively, individual layers of state change material and individual layers of encapsulant material may be deposited separately and sequentially whereby to form a layered coating of alternating phase changeable material layers and encapsulant layers. When so deposited, the layers are from about 150 to about 200 angstroms thick.

After deposit of the state change material and encapsulant material, either after depositing individual layers or after the deposit of substantially all of the phase change material and encapsulant material, the deposit is substantially irreversibly separated into a substantially continuous encapsulant phase 151 having discrete cells 251 of state changeable phase dispersed through the encapsulant phase 151.

The state change material and the encapsulant material may be deposited by sputtering, for example, by sputtering, including cosuttering, the state change material and the encapsulant material, or by reactively sputtering or reactively cosputtering the state change material and the encapsulant material. According to a further exemplification, the state change material and the encapsulant material may be deposited and/or codeposited by evaporation, for example, from heated vessels, with condensation onto the substrate 11 or onto the coated substrate.

After deposition, the deposit is substantially irreversibly separated by a process of energy pulses into a substantially continuous encapsulant phase 151 and discrete cells 251 of a state changeable phase dispersed through the encapsulant phase 151. This may be done by repeatedly vitrifying or by crysatllizing and vitrifying the deposit 15 whereby to affect the aforementioned phase separation.

This is particularly shown in FIGS. 3 and 4. In FIG. 3A, the substantially disordered, substantially uniform deposit is shown having a temperature Tx for the onset of crystallization and a temperature Tm for the onset of melting. Film forming processes, by laser melting with one or several repetitive laser pulses, shown in FIGS. 3B and 4B, results in the separation of small state switchable, disordered cells 251 within a substantially continuous amorphous phase 151. This film forming process results in a substantial but stable phase separation, i.e., in the creation of one phase having a crystallization temperature $Tx_{251}$ and melting temperature $Tm_{251}$ and another phase having a crystallization temperature of $Tx_{151}$ and a melting temperature $Tm_{151}$.

The resulting material is then crystallized as shown in FIGS. 3C and 4C. Crystallization involves heating the deposit to a temperature above $Tx_{251}$ whereby to crystallize the state changeable material 251 results in the separation of small, crystalline, microcrystalline or polycrystalline, chalcogenide-rich cells with melting temperatures of Tm, within a chalcogenide deficient phase or phases with melting temperatures of $Tm_2$, $Tm_3$, etc., while avoiding melting or crystallization of the continuous phase 151, and thereafter allowing the material 15 to rapidly cool. This results in the formation of a state having different optical properties than the disordered material shown in FIGS. 3B and 4B.

The resulting material is then vitrified, as shown in FIGS. 3D and 4D. Vitrification involved heating of the film to a temperature above the highest melting temperature with phase 251, e.g., $Tm_2$ whereby to melt the state changeable material 251 uniformly, while avoiding melting of the continuous phase 151, and thereafter allowing the material 15 to rapidly cool. This allows the chalcogenide-rich material within the individual cells 251 to mix with the chalcogenide deficient material in the individual cells 251, forming a substantially homogeneous amorphous phase within the cells 251.

Crystallization includes solid-solid and solid-liquid chemical reactions, cell boundary and solid-liquid boundary nucleation, resulting in the formation of compounds, compositions and structures, including chalcogenide-rich polycrystalline phase(s) surrounded by chalcogenide deficient phase(s) and the separation of further phases having a plurality of melting and crystallization temperature, for example, as shown in FIG. 4C.

Revitrification includes solid-liquid chemical reactions and liquid-liquid chemical reactions within cell 251 and the boundaries thereof, resulting in the formation of a substantially homogeneous compositions therein, having a crystallization temperature as shown in FIG. 4D.

Thereafter, as shown in FIGS. 3D and 4D, an "erase" or "ordering" pulse is utilized to crystallize the material in cell 251 as shown in FIG. 4D while the continuous phase 151 is unaffected thereby. When a "crystallization" step is referred to herein, also contemplated is a heterogeneous crystallization at a solid-solid or a solid-liquid boundary.

A "recording" or "disordering" pulse, as shown in FIGS. 3C and 4C, is utilized to melt the material in cell 251. The subsequent solidification threeof converts the material within all 251 to a substantially homogeneous, disordered phase. The continuous phase 151 is not melted by the pulse.

In the initial, as-deposited homogeneous film, oxygen is substantially uniformly distributed. However, after one or more melt cycles, e.g., laser induced melt cycles, oxygen rich, stable ceramics, dielectrics, or the like, i.e., components of distributed phase 151, are formed which prevent unlimited grain growth and further undesired phase separation.

After formation or initialization as described above, and shown with particularity in FIGS. 3A through 3C and 4A through 4C, the resulting individual cells 251 of phase changeable material, are in the "o" state, ready to record data through the "write"-"erase" cycle. They are reversibly switchable between:

(a) a disordered first chalcogenide-cross linking agent composition as shown in FIG. 3D; and (b) (i) crystalline or polycrystalline chalcogenide, and (ii) a disordered, second, chalcogenide-cross linking agent composition, depleted in chalcogenide content respect to the first chalcogenide-cross linking agent composition as shown in FIG. 3C.

The crystalline chalcogenide and the amorphous second chalcogenide-cross linking composition phase separate from each other after the formation of the crystalline-polycrystalline chalcogenide phase.

For example, as shown in FIGS. 5 and 6, a deposit of $Te_{83}Sn_6Ge_2Si_3O_6$ may be formed by the reactive sputtering of a $Te_{91}Sn_6Ge_2Si_3$ target onto a suitable substrate. Formation, as described in the aforementioned application of Young and Formigoni phase separates the deposit into a shell-like, continuous phase 151 of $SiO_2$ around discrete, distributed regions 251 of, e.g., $Te_{91}Sn_7Ge_2$. The $Te_{91}Sn_7Ge_2$ is a disordered material. Upon crystallization, e.g., heterogeneous crystallization at cell boundaries, including liquid-solid interfaces, the individual cells 251 phase separate into an ordered Te-rich phase and a relatively disordered, Te-depleted, cross linked phase. For example, with 80 percent Te crystallization, phase separation is believed to occur as:

$Te_{91}Sn_7Ge_2$ (disordered)$\rightarrow$Te(ordered)+$Te_{72}Sn_{2.1}Ge_7$ (ordered or disordered), while with 90 percent Te crystallization, phase separation is believed to occur as:

$Te_{91}Sn_7Ge_2$ (disordered)$\rightarrow$Te(ordered)+$Te_{56}Sn_{3.3}Ge_{11}$ (ordered or disordered).

This may then be revitrified back to the individual cell 251 composition of disordered $Te_{91}Sn_7Ge_2$.

The percent of crystallization, above, may be experimentally determined to optimize the ordering pulse (energy density and pulse duration), reflectivity of reflectivity layers, reflectivity ratios of the phases, etc.

According to a particularly preferred exemplification, an $SiO_2$ coated, 8 inch (20 centimeter) diamter, poly(methylmethacrylate) optical disc substrate may be reactively sputtered with 2 to 8 layer pairs of (1) a 150–500 angstrom film of $Te_{83}Sn_6Ge_2Si_3O_6$ source, and (2) a 30 to 100 angstrom film of $SiO_2$, providing a film 500 to 5000 angstroms thick of phase change material and encapsulant material.

Formation, i.e., phase separation, may be carried out either inside or outside the deposition chamber, or after deposition of the film, or after deposition of each active layer of insulation, anti-ablation, and protective layers. In addition to the phase separation, formation also provides the advantage of release of the trapped argon in the film if the film is made by reactive argon sputtering.

The following example is illustrative of this invention.

EXAMPLE

A glass slide was reactively sputtered in an argon-oxygen atmosphere from a $Te_{89}Sn_6Ge_2Si_3$ target to form a $(Te_{89}Sn_6Ge_2Si_3)_{1-x}O_x$ (where x is from 0.05 to 0.10), thin film. The sample was then subjected to a sequence of vitrifying laser pulses to phase separate the coating into $SiO_2$ and $Te_{91}Sn_7Ge_2$ phases. The sample was then subjected to a sequence of crystallizing and vitrifying laser energy pulses.

A 1 inch by 1 inch by 11 mil, glass substrate was placed in an R. D. Mathis sputtering module 3.75 inches from a 5 inch diameter $Te_{89}Sn_6Ge_2Si_3$ sputtering target. The sputtering module had an SG-1250 power supply with a 13.56 megahertz operating frequency through two RF electrodes. The sputtering module was taken down $10^{-6}$ atmosphere and pressurized to 5 millitorr with argon. The target was then sputtered for fifteen minutes at a bias of 800 volts, and an r.f. target power density of 7.0 watts/in². Thereafter 0.5 volume percent oxygen in argon was introduced into the sputtering module, and reactive sputtering was carried out with an 800 volt self-bias, 7.0 watts/in² power density, 13.56 megahertz power supply for 8 minutes. The resulting thin film had a thickness of 800 angstroms and a nominal $(Te_{83}Sn_6Ge_2Si_3O_6)$ stochiometery.

The coupon was then subjected to a forming process, in which the film was melted 2 to 5 times by a YAG laser with a pulse duration of 15 nanoseconds and an energy density of 30-40 millijoules per square centimeter to form a stable, phase separated structure. The change of the crystallization and melting temperatures before and after formation is shown in FIG. 6, while the shift in crystallization temperature is shown by the optical transmissivity is shown in FIG. 7.

The sample coupon was then subjected to a crystallization-vitrification life test over a 1 micron diameter area cells. A diode laser was used, with a power density of 2-8 milliwats/micron² and a pulse duration of 1-5 microseconds for crystallization, and a power density of 5 to 50 milliwatts/micron², and a pulse duration of 50-200 nanoseconds for vitrification. After formation, the disordered reflectivity (relative) was 1.5 and the disordered reflectivity (relative) was 1.2. After 1000 cycles, following formation, the ordered reflectivity (relative) was still 1.5 and the disordered reflectivity (relative) was 1.2.

While the invention has been described with respect to certain exemplifications and embodiments thereof, it is not intended to limit the scope of the invention thereby but solely by the claims appended hereto.

I claim:

1. In a method of forming an optical data storage device having a state changeable chalcogenide phase change layer reversibly switchable between at least two detectable states, which method comprises co-depositing a chalcogen and a cross linking agent on to a substrate, the improvement comprising:
   (a) co-depositing the chalcogen, the cross linking agent, and an encapsulant on to the substrate and forming a substantially uniform deposit thereof; and
   (b) crystallizing and vitrifying the deposit to substantially irreversibly separate the deposit into a substantially continuous, non-switchable encapsulant phase and discrete cells of state changeable phase disposed through the encapsulant phase, wherein said dispersed, discrete cells of the state changeable phase are reversibly switchable between:
   (i) an amorphous, first chalcogen-cross linking agent composition; and
   (ii) crystalline chalcogen, and an amorphous, second, chalcogen-cross linking agent composition, said second chalcogen-cross linking agent composition having a lower chalcogen content then said first chalcogen-cross linking agent composition, said amorphous, first chalcogen-cross linking agent composition separating into said crystalline chalcogen and said amorphous, second chalcogen-cross linking agent composition.

2. The method of claim 1 comprising sequentially depositing alternating layers (1) of state change material and encapsulant, and (2) of encapsulant.

3. The method of claim 1 comprising co-sputtering the state change material and the encapsulant material.

4. The method of claim 3 comprising cosputtering the state change material and the encapsulant material.

5. The method of claim 3 comprising reactively sputtering the state change material and the encapsulant material.

6. The method of claim 1 comprising evaporating the state change material and the encapsulant material.

7. The method of claim 1 wherein the chalcogenide composition comprises tellurium.

8. The method of claim 7 wherein the chalcogenide composition comprises tellurium and a cross-linking agent.

9. The method of claim 1 wherein the cross linking agent is chosen from the group consisting of Al, In, Ge, Si, Ge, Sn, N, P, As, Sb, Bi, and combinations thereof.

10. The method of claim 9 wherein the cross linking agent comprises germanium.

11. The method of claim 1 wherein the chalcogenide composition comprises:
   (a) a chalcogen;
   (b) a cross-linking agent in an amount sufficient to form a stable, amorphous chalcogenide; and
   (c) a refractory forming agent in an amount sufficient to form a substantially continuous refractory phase.

12. The method of claim 11 wherein the chalcogen is tellurium.

13. The method of claim 11 wherein the cross linking agent comprises germanium.

14. The method of claim 11 wherein the refractory forming agent is chosen from the group consisting of germanium, aluminum and silicon.

15. The method of claim 1 wherein the chalcogenide composition comprises tellurium as the chalcogen and germanium as cross linking agent, and silicon as the refractory forming agent.

16. The method of claim 15 wherein the ratio of germanium to tellurium and germanium is from about 1 to about 20 percent.

17. The method of claim 15 wherein the chalogenide composition further comprises tin.

18. The method of claim 17 wherein the ratio of tin to tellurium is from 1 to 20 percent.

19. The method of claim 15 comprising oxygen.

20. The method of claim 19 wherein:
(a) the ratio of oxygen to total tellurium and germanium is from 1 to 20 percent; and
(b) the ratio of germanium to total tellurium and germanium is from 1 to 20 percent.

* * * * *